(12) United States Patent
Gaudreault

(10) Patent No.: US 8,167,225 B2
(45) Date of Patent: May 1, 2012

(54) CUTTING TOOTH FOR BRUSH CUTTER

(75) Inventor: Daniel Gaudreault, Summerville, SC (US)

(73) Assignee: Gyro-Trac Inc., Quebec (CA)

( * ) Notice: Subject to any disclaimer, the term of this patent is extended or adjusted under 35 U.S.C. 154(b) by 836 days.

(21) Appl. No.: 11/814,457

(22) PCT Filed: Jan. 25, 2006

(86) PCT No.: PCT/CA2006/000103
§ 371 (c)(1), (2), (4) Date: Jul. 20, 2007

(87) PCT Pub. No.: WO2006/079207
PCT Pub. Date: Aug. 3, 2006

(65) Prior Publication Data
US 2008/0298909 A1 Dec. 4, 2008

Related U.S. Application Data

(60) Provisional application No. 60/646,620, filed on Jan. 26, 2005.

(51) Int. Cl.
*B02C 1/10* (2006.01)
*B02C 7/12* (2006.01)
*B02C 13/28* (2006.01)

(52) U.S. Cl. .................. 241/294; 241/101.77

(58) Field of Classification Search ............... 241/294, 241/101.77
See application file for complete search history.

(56) References Cited

U.S. PATENT DOCUMENTS

| | | | |
|---|---|---|---|
| 1,606,324 A | 9/1926 | Short | |
| 4,259,834 A | 4/1981 | Lambert et al. | |
| 4,454,995 A * | 6/1984 | Bloomquist | 241/277 |
| 4,826,090 A * | 5/1989 | Orphall | 241/191 |
| 5,240,192 A * | 8/1993 | Tilby et al. | 241/292.1 |
| 5,513,485 A | 5/1996 | Hashimoto et al. | |
| 5,642,765 A | 7/1997 | Brown | |
| 5,779,167 A | 7/1998 | Wagstaff | |
| 5,873,684 A * | 2/1999 | Flolo | 409/66 |
| 5,941,469 A * | 8/1999 | Spiegemacher | 241/291 |
| 5,975,167 A | 11/1999 | Brown | |
| 6,000,205 A | 12/1999 | Joray | |
| 6,321,518 B1 | 11/2001 | O'Hagan | |
| 6,523,768 B2 * | 2/2003 | Recker et al. | 241/294 |
| 6,644,896 B2 * | 11/2003 | Iinuma | 407/42 |
| 7,137,583 B2 * | 11/2006 | Kammerer | 241/294 |
| 7,568,865 B1 * | 8/2009 | Ketterer et al. | 407/101 |
| 7,607,867 B2 * | 10/2009 | Benson | 407/102 |
| 2001/0045478 A1 * | 11/2001 | Recker et al. | 241/294 |
| 2002/0102138 A1 * | 8/2002 | Iinuma | 407/42 |
| 2003/0219320 A1 * | 11/2003 | Horiike et al. | 407/113 |
| 2003/0222164 A1 | 12/2003 | Denis et al. | |

FOREIGN PATENT DOCUMENTS

GB 2200271 8/1988

* cited by examiner

*Primary Examiner* — Bena Miller
(74) *Attorney, Agent, or Firm* — Merchant & Gould P.C.

(57) ABSTRACT

A cutting tooth is used on a brush cutter head. The cutting tooth includes a cutting portion having a first face and a second face. The first face and the second face cooperate to define a tapering profile terminating in a cutting edge. The first face of the cutting portion carries a plurality of ridges formed thereon to direct cutting debris away from the cutting edge and facilitate passage of the debris along the trailing face when the cutting tooth is in use.

51 Claims, 13 Drawing Sheets

CUTTING TOOTH FOR BRUSH CUTTER

FIELD OF THE INVENTION

The present invention relates to a cutting tooth for use on a brush cutter head.

BACKGROUND OF THE INVENTION

Vast felling and mulching operations are often performed with heavy-duty brush cutters. These brush cutters generally consist of cutter heads removably or permanently fixed on self-propelled vehicles.

Heavy-duty brush cutter heads generally have a plurality of blade-type cutting teeth or hammer-type cutting elements, either hingedly or fixedly mounted to the body of a horizontal drum or to the lower surface of a horizontal disc. High velocity rotation of the drum or of the disc causes the cutting elements to shred wood, debris and the like.

Blade-type cutter heads tend to have an advantage over hammer-type cutters in that the dispersion of woodchips during the cutting operation tends to be minimized. This tends to create safer working conditions for workers. U.S. Pat. Nos. 6,321,518, 5,975,167 and 5,642,765 disclose brush-cutter heads comprising U-shaped cutters hingedly mounted on a support. However, there tends to be some drawbacks associated with this type of head configuration. In particular, the teeth and their corresponding supports tend to be prone to excessive wear and damage as a result of repeated impact by rocks and other hard debris. In addition, the efficacy of these teeth tends to decline from repeated impact with hard debris.

Typical fixed blade-type cutting teeth are made from a plate-like metal section curved into stirrup-shaped elements, comprising a cutting edge on their leading face. The manufacturing of such cutting elements is relatively quick and inexpensive. For example, U.S. Pat. No. 6,764,035, discloses a brush-cutter head comprising cutting teeth, each tooth being made from a bent plate having a uniform thickness. Although the fixed cutting teeth disclosed in this patent tend to be more robust and exhibit improved wear resistance than the hingedly mounted-type cutting teeth, the fixed cutting teeth must nonetheless be sharpened often. The need for frequent sharpening tends to reduce the cutting efficiency of brush cutters thereby impeding productivity and increasing operation and maintenance costs.

Therefore, it would be advantageous to have a cutter head with teeth that exhibit improved wear resistance characteristics. In particular, teeth which do not require frequent sharpening, repair or replacement would be most desirable.

SUMMARY OF THE INVENTION

According to a broad aspect of an embodiment of the present invention, there is provided a cutting tooth for use on a brush cutter head. The cutting tooth includes a cutting portion having a first face and a second face. The first face and the second face cooperate to define a tapering profile terminating in a cutting edge. The first face of the cutting portion carries a plurality of ridges formed thereon to direct cutting debris away from the cutting edge and facilitate passage of the debris along the first face when the cutting tooth is in use.

In an additional feature, the first face is a trailing face and the second face is a leading face. The plurality of ridges is formed on the trailing face. The plurality of ridges protrudes from the trailing face. In another feature, the plurality of ridges is formed flush with said first face.

In a further feature, the plurality of ridges includes at least one pair of adjacent ridges. The at least one pair of adjacent ridges defines a channel therebetween for carrying cutting debris away from the cutting edge when the cutting tooth is in use. In an alternative feature, the plurality of ridges includes pairs of adjacent ridges. Each pair of adjacent ridges defines a corresponding channel therebetween for carrying cutting debris away from the cutting edge when the cutting tooth is in use. The pairs of adjacent ridges and their corresponding channels cooperate with each other to define corrugations on said first face. In a further feature, the corrugations have a generally arcuate profile when viewed in cross-section. In still another feature, the corrugations have a generally crenellated profile when viewed in cross-section.

According to another broad aspect of an embodiment of the present invention, a cutter head for use on a cutter is provided. The cutter head includes a drum rotatably mounted on said cutter and means for causing rotation of said drum relative to said cutter. The drum has a radial outer surface. The cutter head further includes at least one mounting bracket for supporting a cutting tooth. The at least one mounting bracket is carried on the radial outer surface of the drum. Also provided is at least one cutting tooth mounted to the at least one mounting bracket. The at least one cutting tooth includes a cutting portion. The cutting portion has a first face and a second face. The first face and the second face cooperate to define a tapering profile terminating in a cutting edge. The first face has at least one pair of ridges formed thereon to direct cutting debris away from said cutting edge and facilitate the passage of cutting debris along said first face when said cutter head is in use. In an additional feature, the cutting tooth is fixedly mounted to the mounting bracket. Alternatively, the cutting tooth is rotatably mounted to the mounting bracket.

BRIEF DESCRIPTION OF THE DRAWINGS

The embodiments of the present invention shall be more clearly understood with reference to the following detailed description of the embodiments of the invention taken in conjunction with the accompanying drawings, in which.

DETAILED DESCRIPTION OF THE EMBODIMENTS OF THE INVENTION

Figure 1:
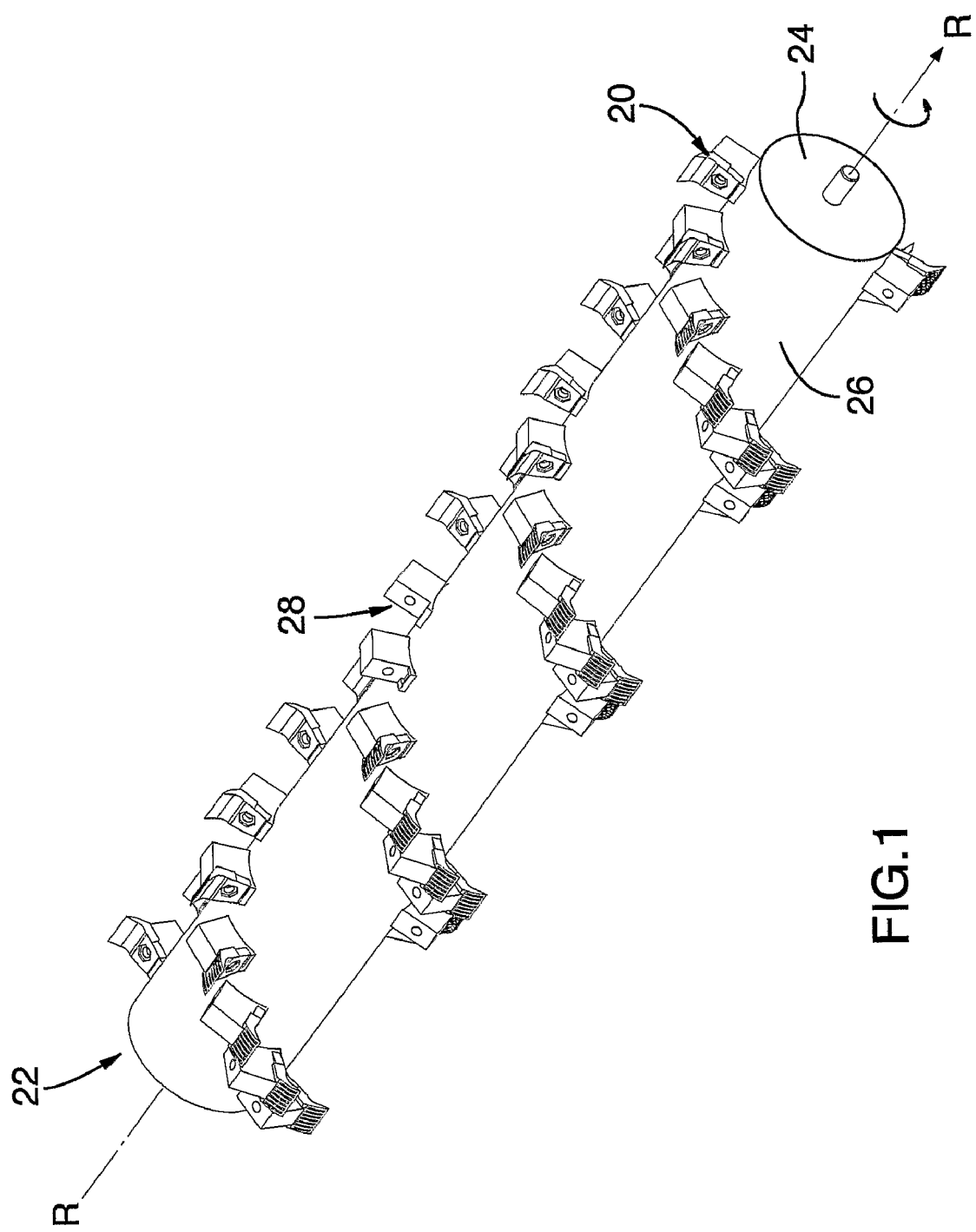
FIG. 1 is a front perspective view of a brush cutter head according to an embodiment of the present invention.

The description which follows, and the embodiments described therein are provided by way of illustration of an example, or examples of particular embodiments of principles and aspects of the present invention. These examples are provided for the purposes of explanation and not of limitation, of those principles of the invention. In the description that follows, like parts are marked throughout the specification and the drawings with the same respective reference numerals.

Figure 2:
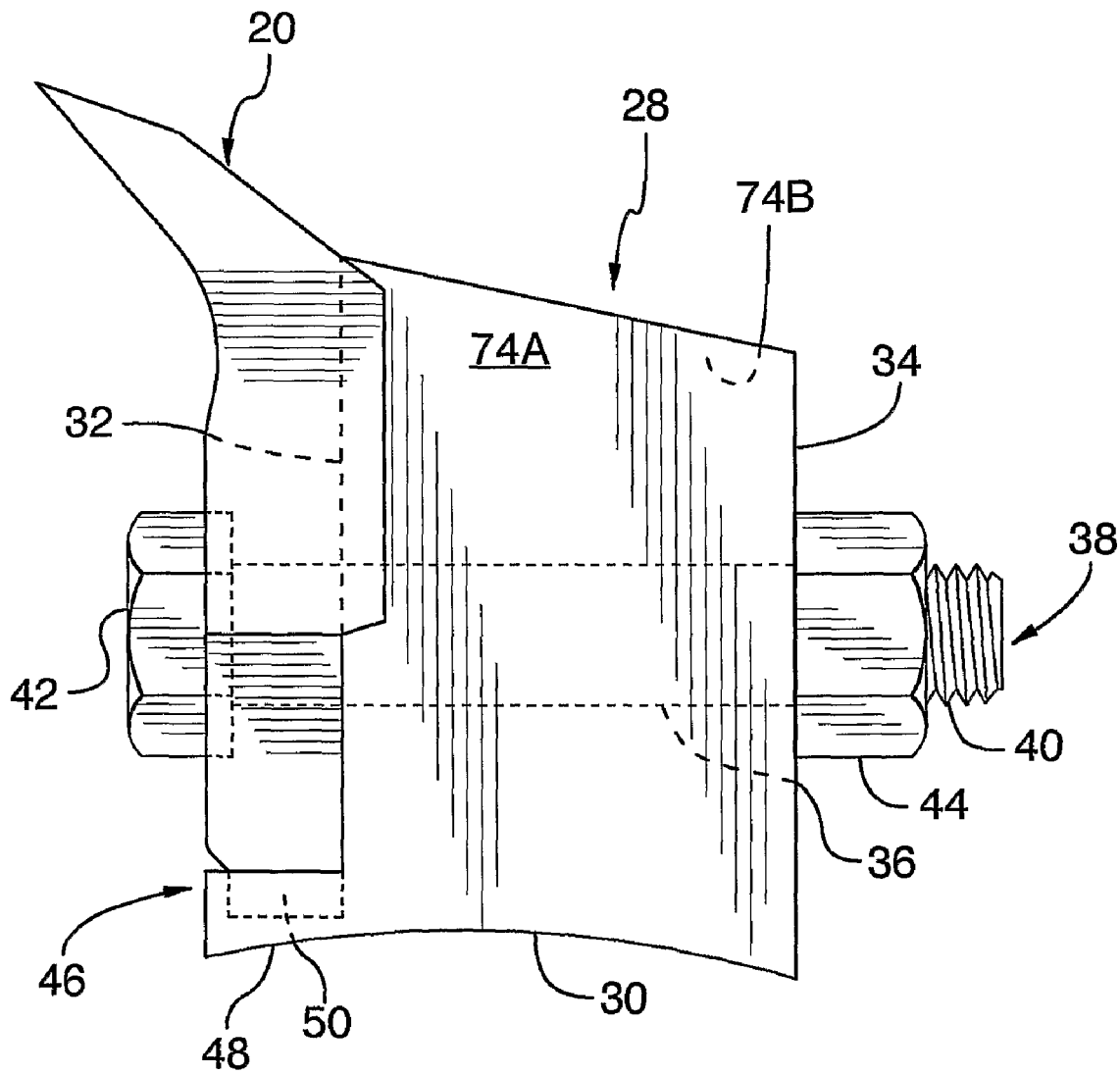
FIG. 2 is a side elevation view showing a mounting bracket and cutting tooth of the brush cutter head of FIG. 1.
Figure 3A:
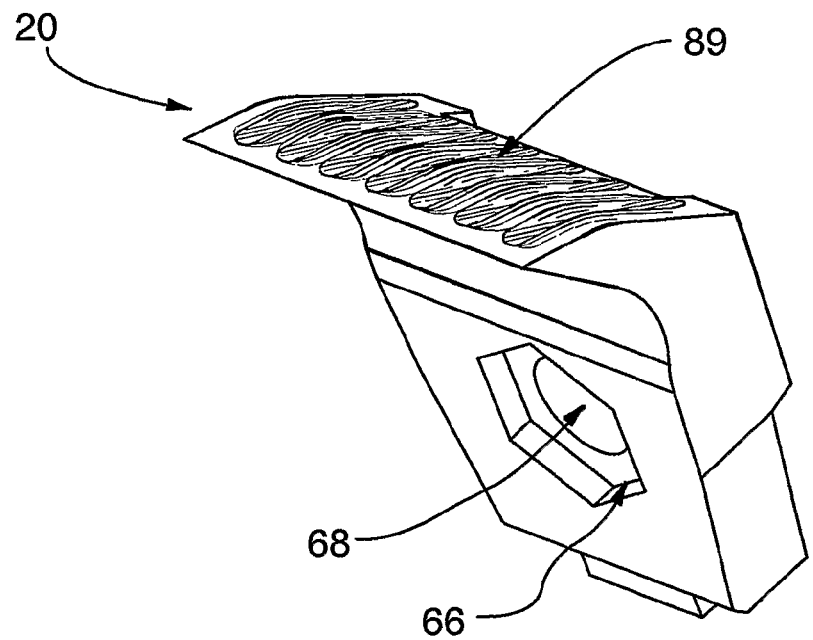
FIG. 3A is a front right perspective view of the cutting tooth shown in FIG. 2.
Figure 3B:
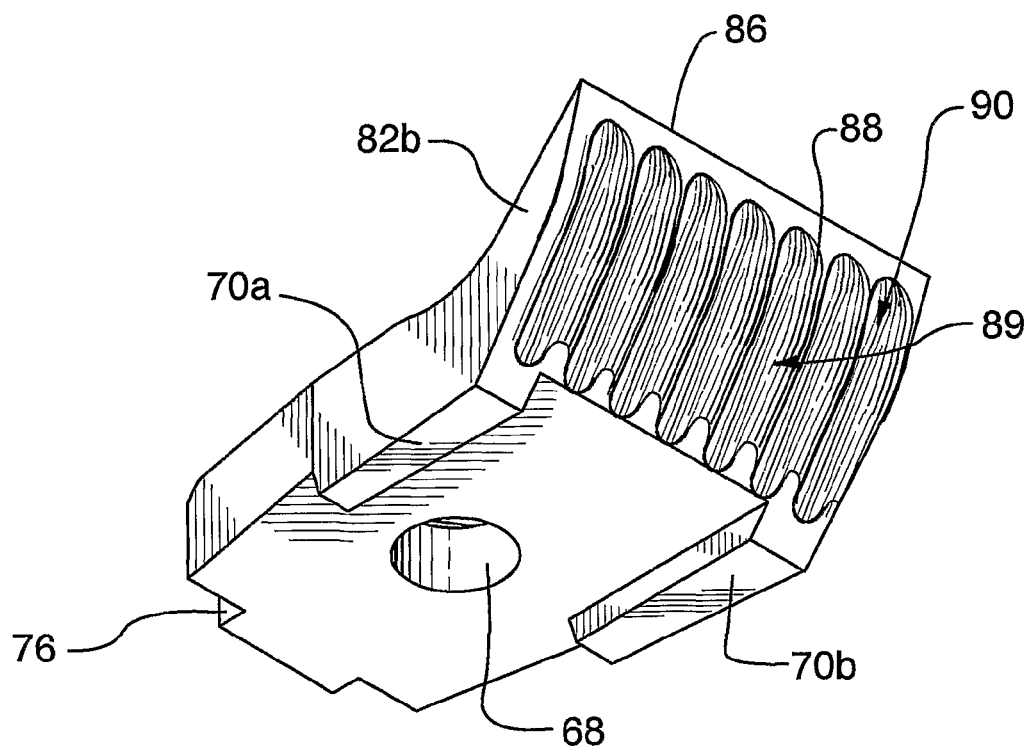
FIG. 3B is a rear right perspective view of the cutting tooth shown in FIG. 2.

Referring to FIGS. 1 and 2, there is shown a cutting tooth generally designated with reference numeral 20. Cutting tooth 20 is designed to be mounted onto a cutter head 22 of the type used to cut trees, brush or the like. It will however be appreciated that cutting tooth 20 may be mounted on other types of cutter heads, for instance, those used for shredding paper and/or metal.

Cutter head 22 has a horizontal drum 24 that is rotatably mountable to a brush cutter (not shown). A drive assembly (not shown) is provided for driving rotation of the horizontal drum 24. More specifically, the drive assembly includes a drive motor (not shown) that is operatively connected to the horizontal drum 24 by way of an arrangement of one more drive shafts, cardans, chains, sprockets, belts, pulleys or the like, as is generally known in the art.

The drum 24 carries about its outer surface 26 a plurality of mounting brackets or blocks 28 disposed in a generally helical fashion, upon which may be secured a corresponding plurality of cutting teeth 20. Each mounting bracket 28 is of unitary construction and is formed with a generally concave face 30 that conforms to the curved profile of the outer surface 26. The mounting brackets 28 may be secured to the drum 24 by welding, or may be removably attached to the drum with fasteners, for instance, screws, bolts or the like. Each mounting bracket 28 further includes a first face 32 for abutting against the cutting tooth 20; a second, opposed, face 34; and a bore 36 extending between the first face 32 and second face 34, for accommodating a fastener 38. The fastener 38 is used to attach the cutting tooth 20 to the mounting bracket 28. In this embodiment, the fastener 38 takes the form of a bolt 40 having a generally hexagonal head 42. A nut 44 is used to secure the bolt 40 in place. Adjacent the concave face 30, a lip member 46 projects outwardly from the first face 32 to form a ledge 48 which supports a portion of cutting tooth 20. As will be explained in greater detail below, the ledge 48 has a cutout 50 defined therein that is adapted to receive a mating portion of the cutting tooth 20.

Figure 4:
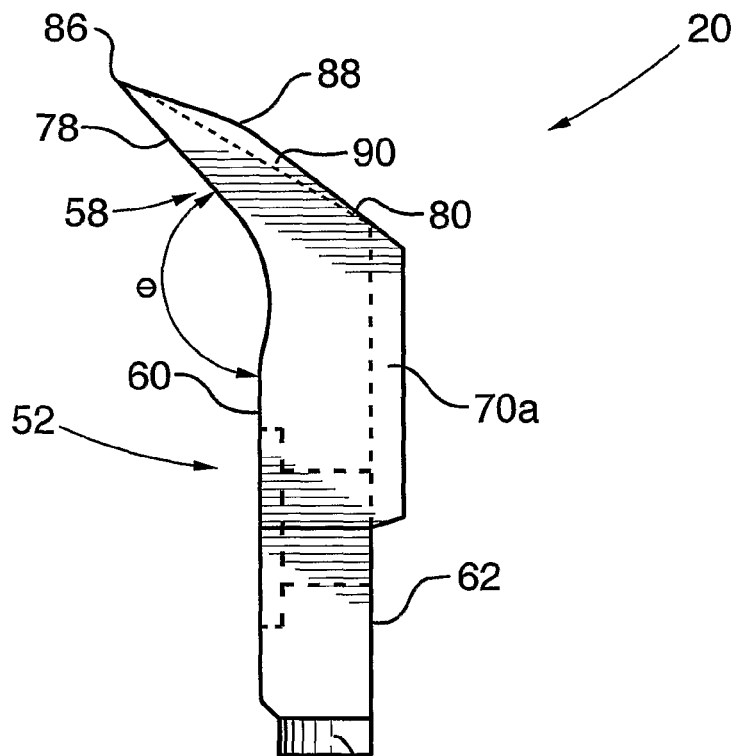
FIG. 4 is a side elevation view of the cutting tooth of FIG. 2.
Figure 5:
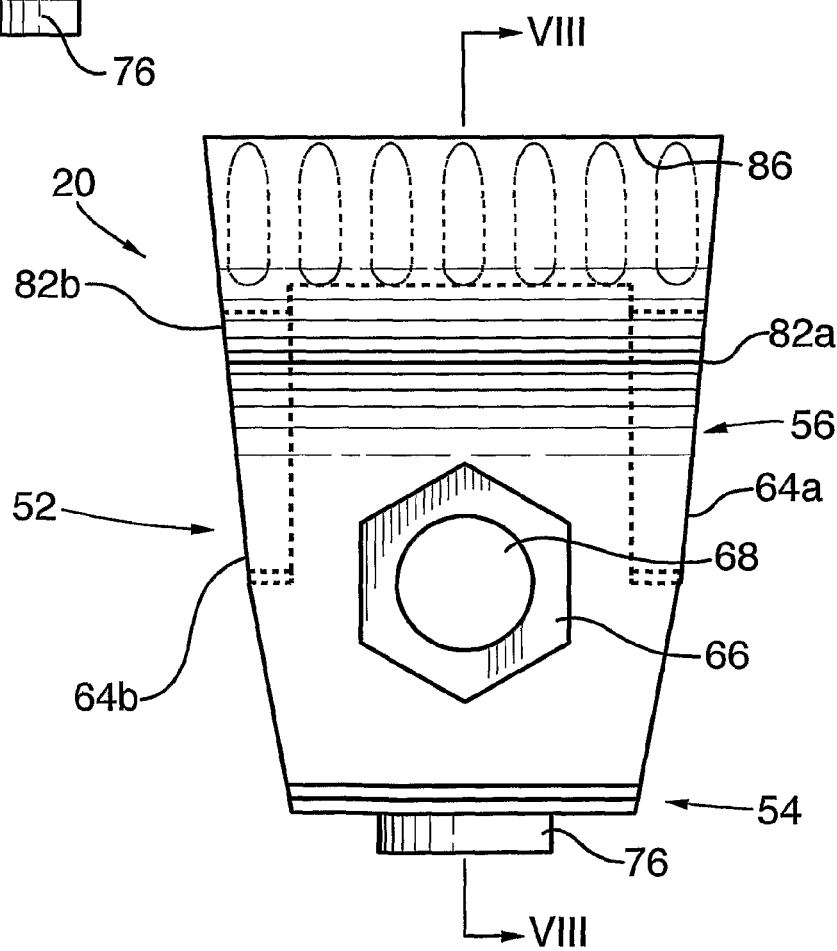
FIG. 5 is a front elevation view of the cutting tooth of FIG. 2.

Referring to FIGS. 4 and 5, cutting tooth 20 includes a relatively long, plate-like, base portion 52 having a first end 54 and a second end 56, and a relatively short cutting portion 58 mounted to the second end 56 of the base portion 52. Base portion 52 has a generally planar, leading face 60, an opposing trailing face 62 and two, spaced apart, lateral faces 64a and 64b. The lateral faces 64a and 64b taper gently from the second end 56 to the first end 54 of the base portion 52.

A rebate 66 conforming substantially to the shape of the hexagonal head 42 is formed in leading face 60. Defined in the rebate 66 is a bore 68 that extends through the base portion 52 and opens onto the trailing face 62. The bore 68 is adapted to receive the bolt 40 therethrough to permit fastening of the cutting tooth 20 to the mounting block 28. It will be appreciated that when cutting tooth 20 is mounted to mounting block 28 and nut 44 is secured, the rebate 66 and the hexagonal head 42 of bolt 40 cooperate with each other to discourage rotation of the bolt 40 about the cutting tooth 20.

As best shown in FIGS. 3A, 3B, 6 and 7, the base portion 52 further includes a pair of integrally formed, spaced apart, shoulder portions 70a and 70b which stand proud of the trailing face 62 to create somewhat of a raised profile. Shoulder portions 70a and 70b extend longitudinally substantially from the second end 56 of base portion 52 to an intermediate region 72 thereof located roughly midway between the first and second ends 54 and 56. When seen in rear elevation view, each shoulder portion 70a and 70b flares outwardly from lateral face 64a, 64b, respectively. The spacing between shoulder portions 70a and 70b is sized to allow the mounting block 28 to be received therebetween. When the cutting tooth 20 is mounted to the mounting block 28, the shoulder portions 70a and 70b abut opposite side faces 74a and 74b of the mounting block 28 (as best shown in FIG. 2) thereby preventing rotation of the cutting tooth 20 relative to mounting block 28. It will thus be understood that in this arrangement the shoulder portions 70a and 70b tend to act as stops against the rotation of the cutting tooth 20 which could otherwise occur during operation of the brush cutter as a result of repeated impact of brush, rocks or the like on the cutting tooth 20.

Figure 6:
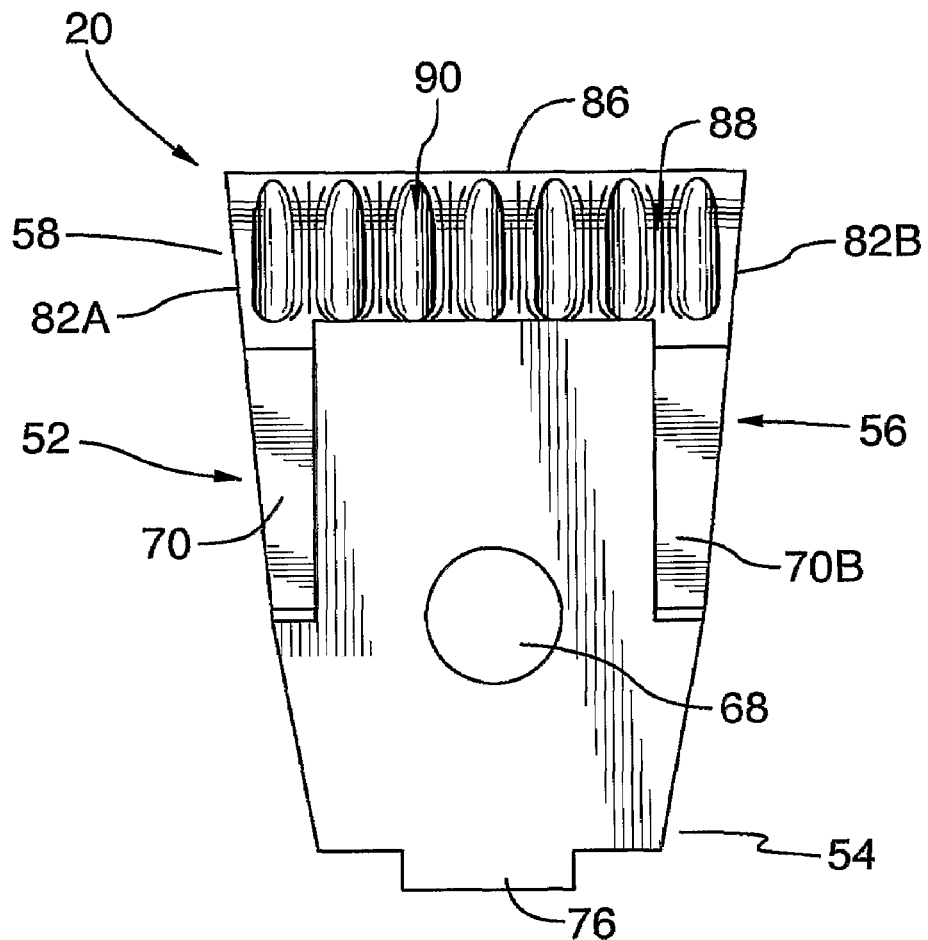
FIG. 6 is a rear elevation view of the cutting tooth of FIG. 2.
Figure 7:
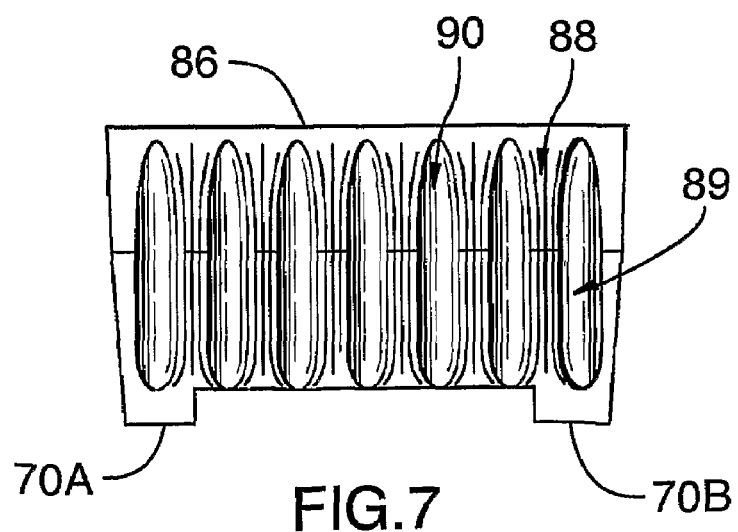
FIG. 7 is a top plan view of the cutting tooth of FIG. 2.

Referring to FIG. 6, the first end 54 of base portion 52 carries a fitting in the nature of a generally rectangular lug 76 for mating connection with the corresponding cutout 50 formed in ledge 48 of the mounting block 28. Lug 76 serves to prevent rotation of cutting tooth 20 about the mounting block 28 during operation of the cutter head. Preferably, lug 76 is integrally formed with base portion 52. However, this need not be the case in every application. In an alternate embodiment, the fitting or lug could be manufactured as a separate element and later attached to the base portion by welding or the like.

When tooling the cutting head 22, the cutting tooth 20 is placed onto mounting block 28. More specifically, the shoulder portions 70a and 70b are positioned so as to bound the mounting block 28 on either side thereof. The lug 76 carried on the first end 54 of base portion 52 is inserted in cutout 50 formed in ledge 48 of the mounting block 28. The bore 68 formed in the base portion 52 is aligned with the bore 36 defined in the mounting block 28. The bolt 40 is inserted through the aligned bores 68 and 36 to extend proud of the second face 34 of the mounting block 28. The nut 44 is then tightened onto the bolt 40 to thereby fasten the cutting tooth 20 onto the mounting block 28.

In this embodiment, cutting tooth 20 is provided with several structures (shoulder portions 70a and 70b and lug 76) for blocking rotation of the cutting tooth 20 relative to the mounting block 28. In alternative embodiments, additional or replacement structures could be provided to prevent rotation of the cutting tooth. For instance, the disposition and configuration of the shoulder portions could be modified. The profile of the back face could be altered to achieve the same rotation stop function. Modifications to the fitting or lug are also possible. For instance, in other embodiments, the fitting could be configured differently (i.e. in the form of a square, circular, or other geometric shape). Furthermore, the fitting could be disposed at different locations on the base portion. In other embodiments, more than one fitting may be used. In a further alternative embodiment, it may be possible to construct a cutting tooth having a single rotation blocking structure. Alternatively, fitting could be replaced with an aperture that is sized to mate with a lug disposed on the mounting block.

In still further embodiments, cutting tooth 20 could be made without shoulder portions 70a and 70b and lug 76. In such embodiments, the mounting block could be adapted and reconfigured with one or more rotation blocking structures. For instance, the mounting block could be provided with a pair of shoulders which flare out frontwardly from its side faces for wrapping about the lateral faces 64a and 64b of the cutting tooth.

Figure 8:
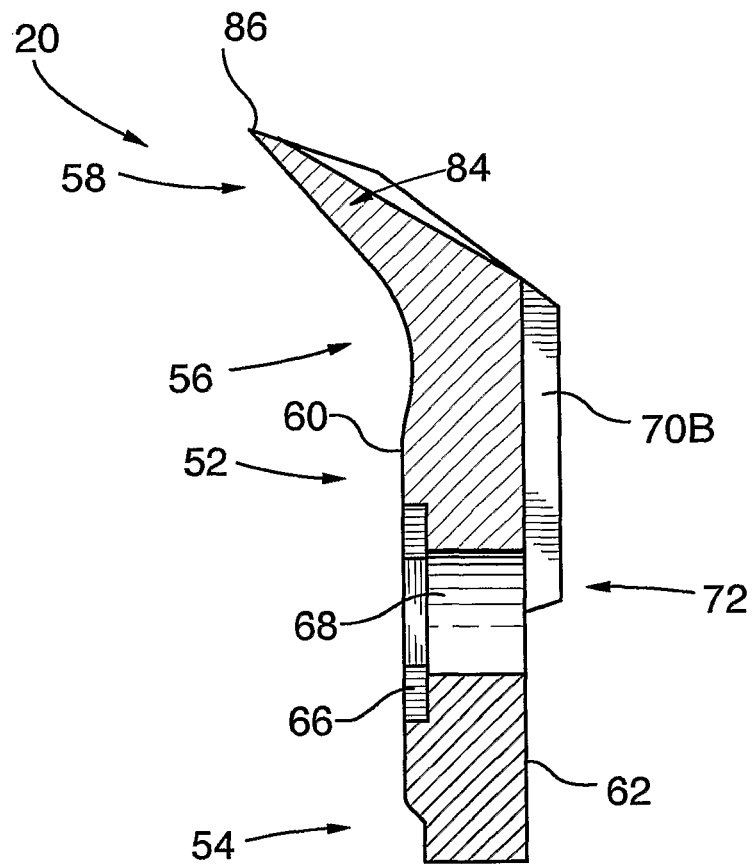
FIG. 8 is a cross-sectional view of the cutting tooth shown in FIG. 5 taken along line VIII-VIII.
Figure 9:
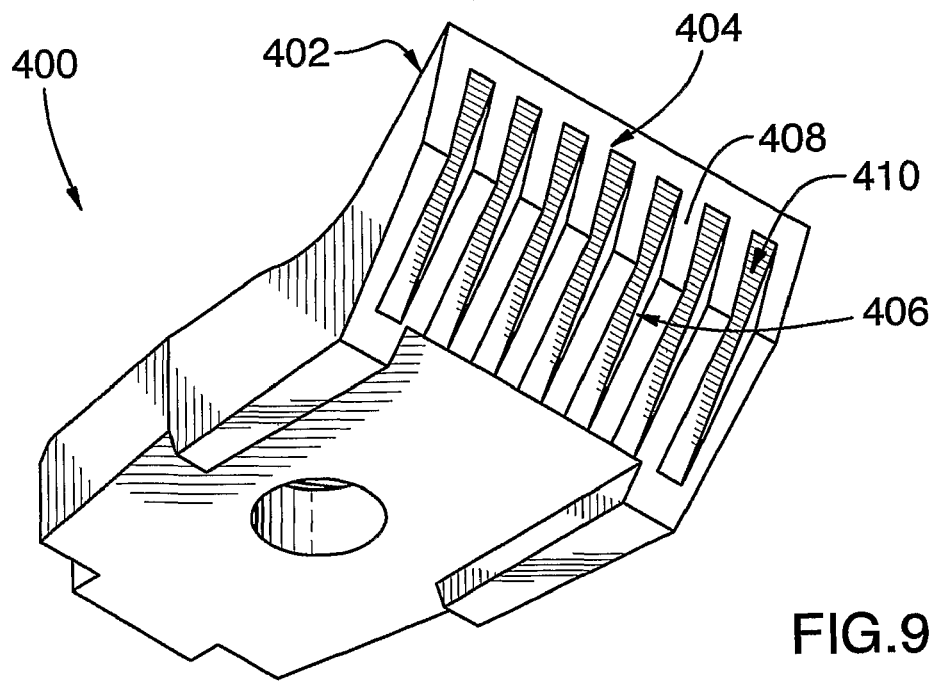
FIG. 9 is a rear right perspective view of the cutting tooth according to an alternate embodiment of the present invention.
Figure 10:
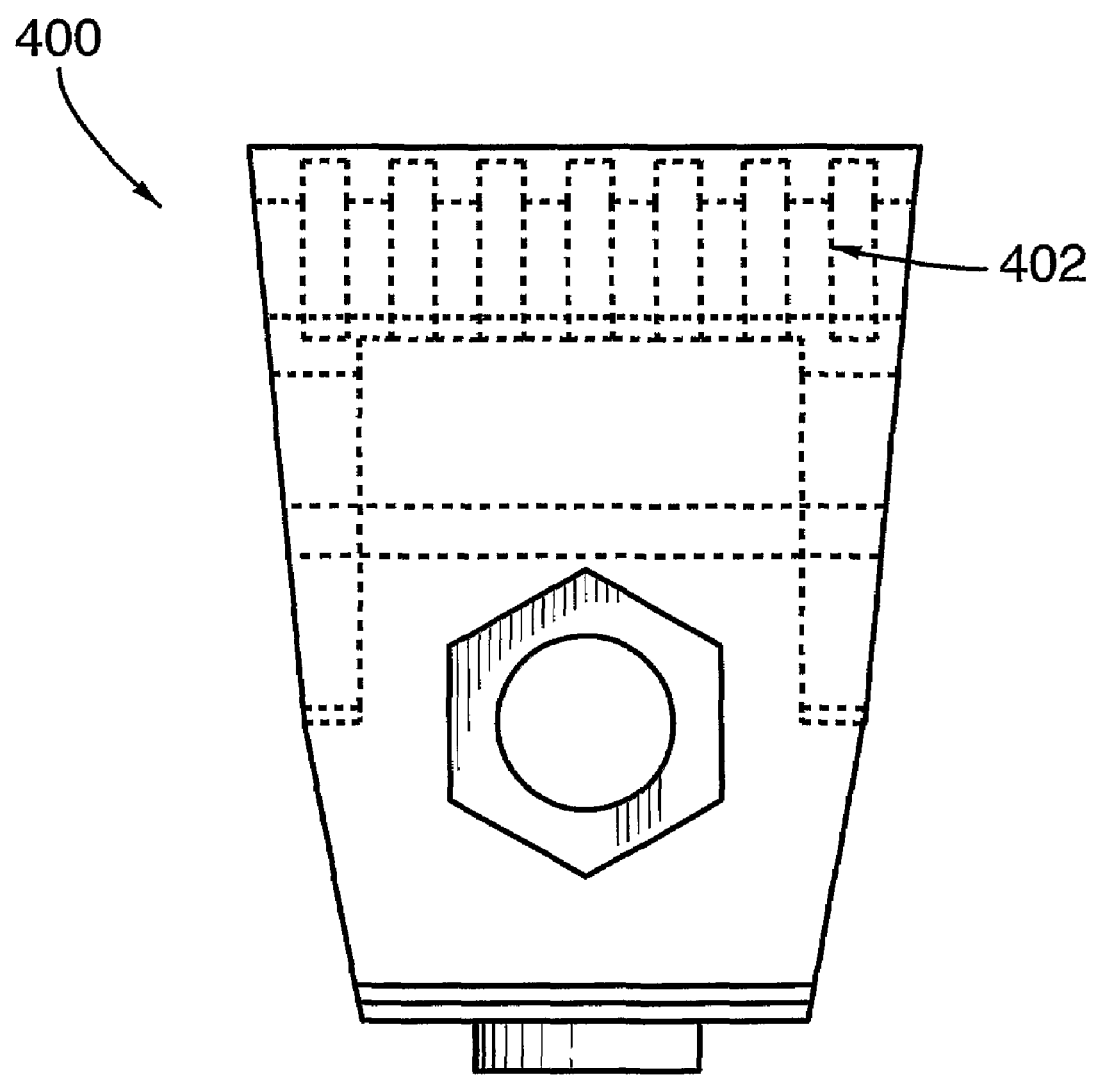
FIG. 10 is a front elevation view of the cutting tooth of FIG. 9.
Figure 11:
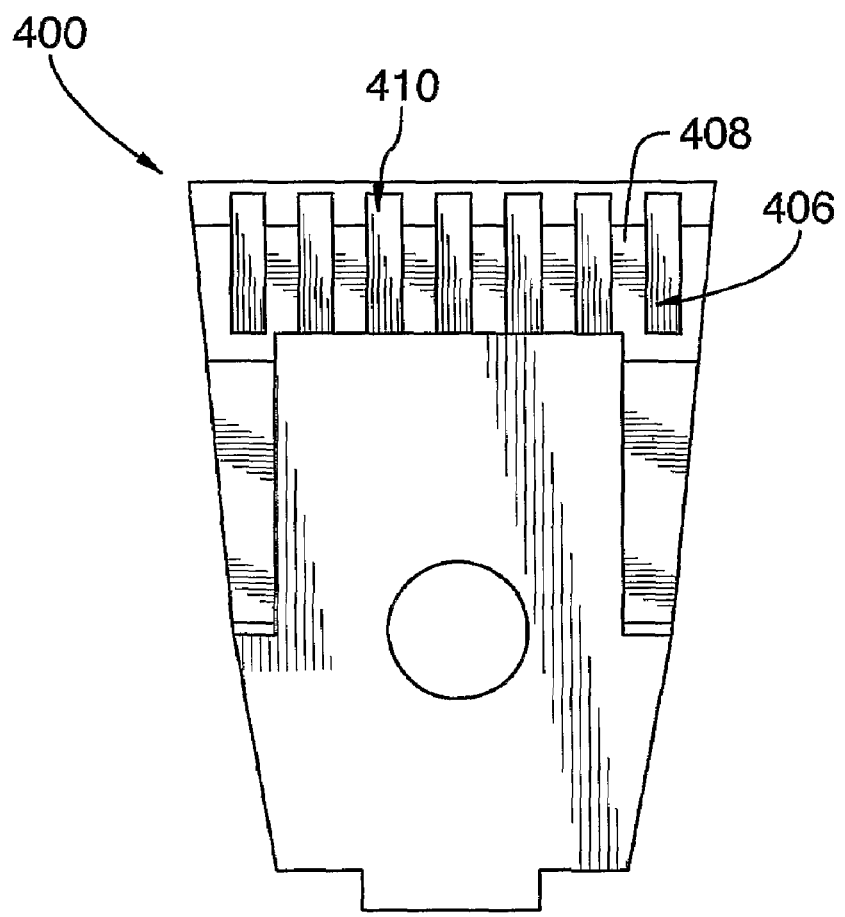
FIG. 11 is a rear elevation view of the cutting tooth of FIG. 9.
Figure 12:
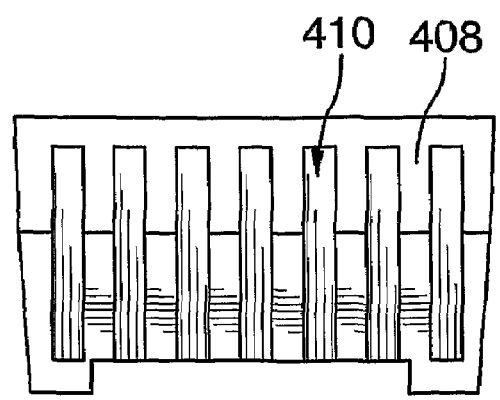
FIG. 12 is a top plan view of the cutting tooth of FIG. 9.

As best shown in FIGS. 4 and 8, the cutting portion 58 is carried on the second end 56 of the base portion 52 in a generally, forwardly leaning or canted fashion. Preferably, the cutting portion 58 is integrally formed with the base portion 52 and both are fabricated from a plate of hardened steel. In this embodiment, the steel plate is bent forward to obtain the forwardly leaning cutting portion 58. Alternatively, the cutting tooth 20 could be cast with its cutting portion 58 leaning forward relative to its base portion 52. It will however be appreciated that in alternative embodiments, the cutting and base portions could be manufactured separately and then assembled to form the cutting tooth by welding, fastening or the like.

The cutting portion 58 includes a leading face 78, an opposed trailing face 80 and two spaced-apart lateral faces 82a and 82b. The leading face 78 of the cutting portion 58 joins the leading face 60 of the base portion 52 while similarly, the trailing portion 80 connects to trailing portion 62 of the base portion 52. An obtuse angle θ is formed between the leading face 78 and the leading face 60. Preferably, the angle θ lies between about 100 degrees and about 170 degrees. Most preferably, the angle θ lies between about 120 and about 150 degrees.

The leading and trailing faces 78 and 80 cooperate with each other to define a tapering, wedge-like, profile 84 that terminates in a cutting edge 86. The cutting edge 86 is carried forwardly of the leading face 60 of the base portion 52 such that it tends to be the first element of cutting tooth 20 to make contact with the brush. In the preferred embodiment, the cutting edge 86 extends generally linearly between the lateral faces 82a and 82b and substantially parallel to the rotational axis R-R of the cutter head 22. However, in alternative embodiments, the cutting edge could be configured differently. For instance, the cutting edge could be configured to extend generally diagonally between the lateral faces 82a and 82b, askew of the rotational axis R-R. This configuration would tend to favor one end of the cutting edge over the other contacting the brush. In a further alternative, the cutting edge could be scalloped or formed to extend in a generally, zigzagging fashion.

As shown in FIGS. 5 and 6, the trailing face 80 of the cutting portion 58 has a plurality of knuckle-like protuberances in the nature of arcuate ridges 88 formed thereon, which extend from the cutting edge 86 until the juncture of trailing faces 80 and 62. The ridges 88 are disposed along the trailing face 80 in spaced apart fashion. Defined between each pair of adjacent ridges 88 is an arcuate channel or groove 90. The alternating arrangement of ridges 88 and channels 90 define corrugations 89 on the trailing face. These corrugations serve to direct rocks, wood chips and other debris away from the cutting edge 86 thereby minimizing dispersion of the debris over the cutting area.

In this embodiment, the grooves 90 are machine ground into the trailing face 80 during fabrication. However, it should be appreciated that in alternative embodiments, the cutting portion 58 could be cast or forged in such a way that grooves and ridges are formed.

During operation of the cutter head 22, the cutting edge 86 of each cutting tooth 20 comes into contact with the brush. Debris is created as a result of the cutting action of the cutting tooth 20. As the debris passes over the cutting edge 86, it abrades the surface of the cutting edge 86 thereby sharpening the cutting tooth 20. This sharpening action tends to maintain or enhance the cutting efficiency of the cutting tooth and tends to reduce the need for mechanical sharpening. Thereafter the debris travels along the channels 90 to be carried away from cutting edge 86.

In this embodiment, the cutting tooth 20 has a height H measured from the cutting edge 86 to first end 54 of the base portion 52; a width W measured between lateral faces 82a and 82b at the edge 86; and depth D measured from the leading face 60 to the trailing face 62 of base portion 52. In this embodiment, the cutting tooth 20 has a height H of 3 to 30 centimeters, a width W of 3 to 10 centimeters, and a depth D of 0.2 to 5 cm. It will however be appreciated that the dimensions of the cutting tooth may be modified to suit a particular application or a particular brush cutter head.

While in this embodiment, the corrugations 89 have a generally arcuate profile when viewed in cross-section, it will be appreciated that this need not to be the case in all applications. In alternative embodiments, the corrugations could be configured differently. For instance, the corrugations could have a generally dentate or zigzag profile when viewed in cross-section. Other profiles may also be employed to similar advantage.

FIGS. 9 to 12 show an exemplary embodiment wherein an alternate cutting tooth is designated generally with reference numeral 400. Cutting tooth 400 is generally similar to cutting tooth 20 in that it has a leading face 402 and a trailing face 404. The trailing face 404 has formed thereon corrugations 406 defined by an alternating arrangement of ridges 408 and channels 410. The corrugations 406 differ from corrugations 89 shown in FIGS. 3A and 3B in that the corrugations 406 have a generally crenellated profile when view in cross-section.

Figure 13:
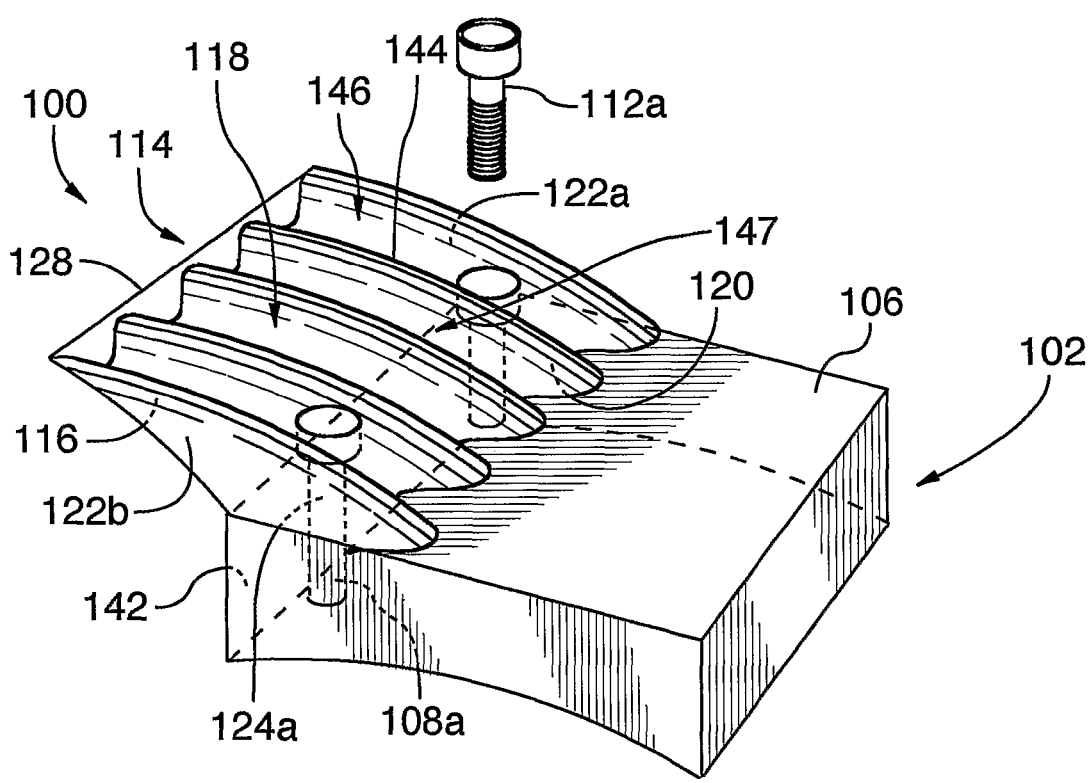
FIG. 13 is a rear right perspective view of a cutting tooth according to a further alternate embodiment of the present invention.
Figure 14:
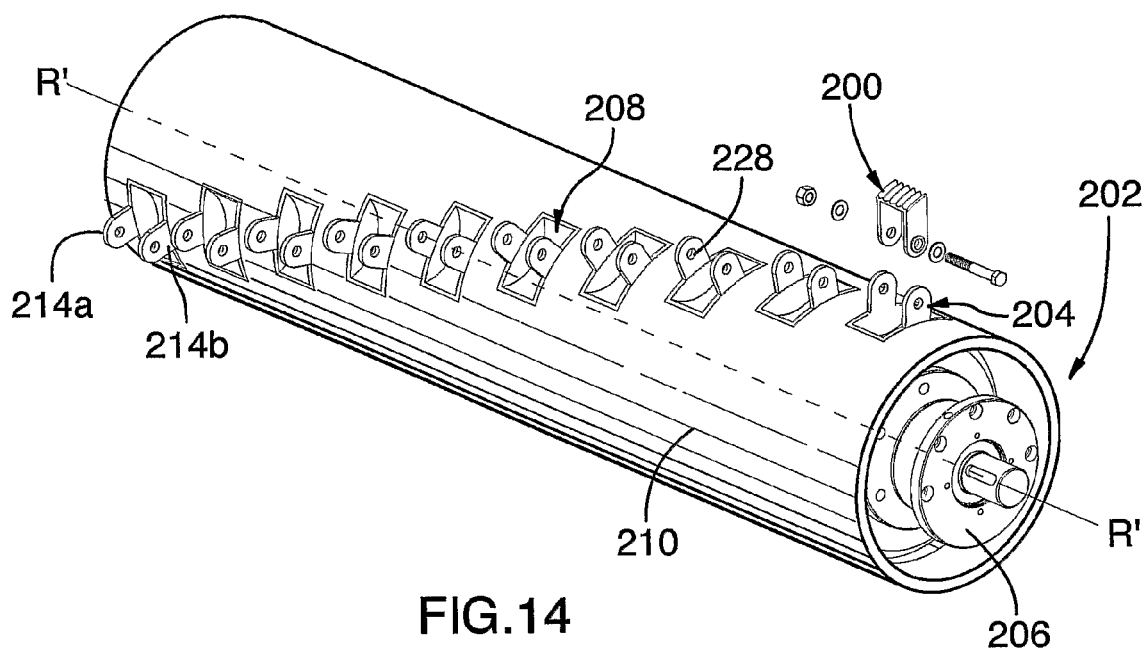
FIG. 14 is a front perspective view of a brush cutter head according to another embodiment of the present invention.

While in the previously described embodiments, the cutting tooth 20 and 400 are formed with well-defined cutting and base portions, it will be appreciated that this need not be the case in every application. In alternative embodiments, the cutting tooth could be configured such that the base portion is either substantially reduced in size or eliminated altogether. With reference to FIG. 13, there is shown a cutting tooth 100 which has no substantial base portion. The cutting tooth 100 is mounted on the surface of a cutting head (not shown) by way of a mounting block 102. Mounting block 102 is of unitary construction and is adapted to be secured on the drum (not shown) of the cutting head by welding or with removable fasteners such as screws, bolts or the like. Mounting block 102 is formed with a concave face 104 adapted to conform to the curved profile of the drum, and an opposed top face 106. Defined within the top face 106 is a pair of threaded, blind bores 108a and 108b that extend to an intermediate region 110 located roughly midway between the concave face 104 and the top face 106. Bores 108a and 108b accommodate a corresponding pair of threaded fasteners 112a, 112b used to attach cutting tooth 100 to mounting block 102.

Cutting tooth 100 includes a cutting portion 114, but in contrast with cutting tooth 20, it is substantially devoid of a base section. In this embodiment, the cutting portion 114 of cutting tooth 100 is mounted directly onto the top face 106 of the mounting block 102. Cutting portion 114 includes a face 120 for abutting the top face 106. The abutting face 120 is adapted to conform to the top face 106. The cutting portion 114 further includes a gently curved leading face 116, an opposed arcuate trailing face 118 and two spaced apart, lateral faces 122a and 122b. In an alternative embodiment, leading and trailing faces 116 and 118 could be made planar.

A pair of spaced apart, bores 124a and 124b extend generally perpendicularly from the abutting face 120 to the trailing face 118. Near the trailing face 118, the diameter of each bore 124a, 124b is enlarged to form a rebate (not shown). The rebate is sized to wholly receive therein the head of fastener 112a or 112b, as the case may be. In this manner, when the cutting tooth 100 is mounted to the mounting block 102, the heads of fasteners 112a and 112b tend not to protrude from the trailing face 118.

To mount cutting tooth 100 onto mounting block 102, the abutting face 120 is placed on the top face 106 of the mounting block 102 and the bores 124a and 124b of the cutting portion 114 are aligned with the corresponding threaded bores 108a and 108b of the mounting block 102. Fasteners 112a, 112b are inserted into the bores 124a, 108a and 108b, 124b, respectively and secured.

In like fashion to the leading and trailing portions 78 and 80 of cutting portion 58, the leading and trailing faces 116 and 118 cooperate to define a tapering, wedge-like, profile 126 that terminates in a cutting edge 128. As with cutting edge 86 of cutting portion 58, the cutting edge 128 is carried forwardly of the leading face 116 such that it tends to be the first element of cutting tooth 100 to make contact with brush. Similarly, the cutting edge 128 preferably extends linearly between lateral faces 122a and 122b of the cutting portion 58.

When assembled to the mounting block 102, the leading face 116 of the cutting portion 114 joins the leading face 142 of the mounting block 102.

The trailing face 118 has an alternating arrangement of ridges 144 and grooves 146 which define corrugations 147. Disposed along the trailing face 118 in spaced-apart manner, the ridges 144 extend from the cutting edge 128 and terminate at the abutting face 120. The grooves 146 are defined between each respective pair of adjacent ridges 144. In like fashion to corrugations 89, the corrugations 147 serve to direct rocks, wood chips and other debris away from the cutting edge 126 to thereby reduce the dispersion of the debris over the cutting area. As the debris passes over the cutting edge 128, it abrades the surface of the cutting edge 128 thereby sharpening the cutting tooth 100.

While in the previous embodiments, cutting teeth 20, 100 and 400 were fixedly mounted to the cutting head, it will be appreciated that other embodiments, a cutting tooth could be mounted for rotation relative to a cutting head. In the alternate embodiment shown in FIGS. 14 to 17, such a cutting tooth is generally designated with reference numeral 200. A plurality of cutting teeth 200 are mounted onto a horizontal cutter head 202 by way of a corresponding plurality of mounting blocks or brackets 204.

The cutter head 202 has a horizontal drum 206 that is generally similar to drum 24 of cutter head 22 except that in this embodiment, the horizontal drum 206 has a plurality of generally concave depressions 208 defined on its outer surface 210 which are sized to accommodate therein the corresponding plurality of mounting brackets 204.

Mounting bracket 204 has a base portion 212 for insertion into the depression 208 and pair of spaced apart, mounting arms 214a and 214b that are mounted on the base portion 212. The base portion 212 includes a pair of spaced apart, side walls 216a and 216b that extend upwardly from, and are supported on, a generally, arcuate or convex bottom wall 218. The convex curvature of bottom wall 218 corresponds generally to the concave curvature of the depression 208. The bottom edge 220 of each side wall 216a, 216b is convexly curved to conform to curvature of the bottom wall 218. Similarly, the top edges 222 of each side wall 216a, 216b are also convexly curved. The curvature of the top edges 222 is designed to match the radius of curvature of the outer surface 210 of the drum 206' such that when the mounting bracket 204 is mounted in the depression 208, only the mounting arms 214a and 214b can be seen to be protruding from the outer surface 210. It will thus be appreciated that when seen a side elevation view, the base portion 212 has a generally, almond-shaped profile. The bottom wall 218 and the pair of spaced apart side walls 216a and 216b cooperate with each other define a hollow 224. The hollow 224 is sized to allow the passage of cutting tooth 200 therethrough during operation of the cutter head 202.

To mount the mounting bracket 204 to the cutter head 202, the base portion 212 is inserted into the depression 208 and the top edges 220 of side walls 216a and 216b and the lateral edges 226a and 226b of the bottom wall 218, are welded to the outer surface 210 of the drum 206.

In this embodiment, each mounting arm 214a, 214b is fixed to each respective side wall 216a, 216b by way of welding. However, in alternative embodiments, the mounting arms could be integrally formed with the base portion. Defined within each mounting arm 214a and 214b, is a bore 228 that is adapted to receive a pivot pin 230. The pair of pivot pins 230 support the cutting tooth 200 for rotational movement. A person skilled in the art will acknowledge that cutting tooth 200 can be mounted for rotation about the cutter head 202 in a number of ways.

The generally U-shaped cutting tooth 200 has a pair of mounting arms 232a and 232b and a cutting portion 234 centrally disposed between the mounting arms 232a and 232b. The cutting portion 234 includes a pair of opposed ends 236a and 236b from which depend mounting arms 232a and 232b, respectively. Each mounting arm 232a and 232b terminates with a free end 238a and 238b. Defined adjacent each free end 238a, 238b is a bore 240 for receiving the pivot pin 230.

Figure 15:
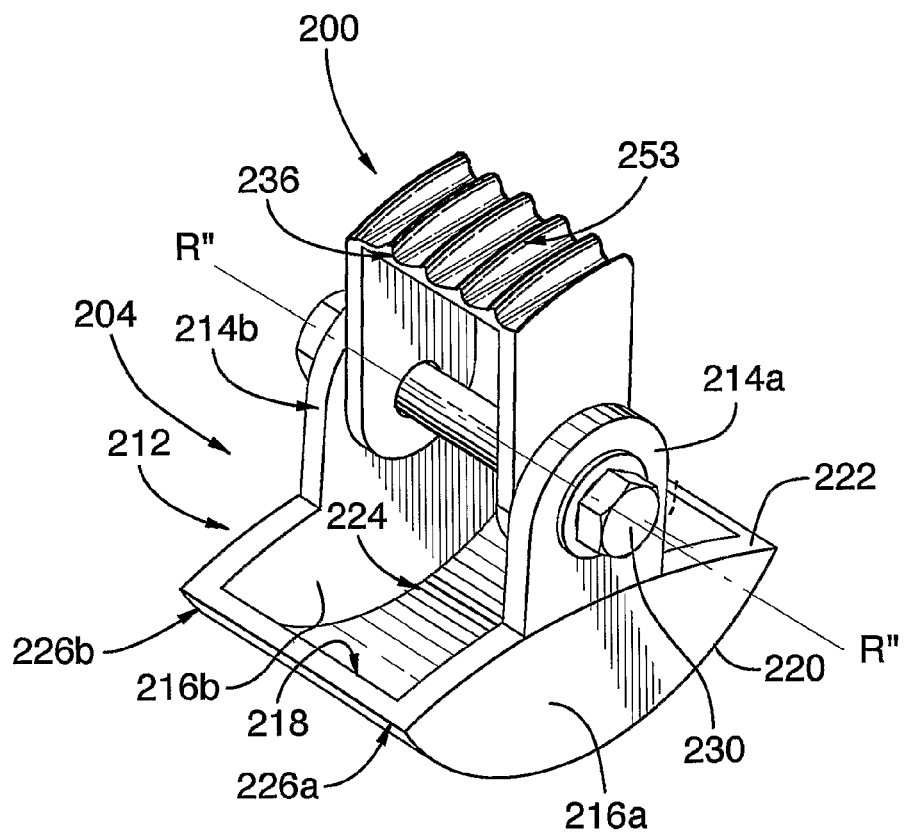
FIG. 15 is a front perspective view showing a mounting bracket and a cutting tooth of the brush cutter head of FIG. 14.
Figure 16:
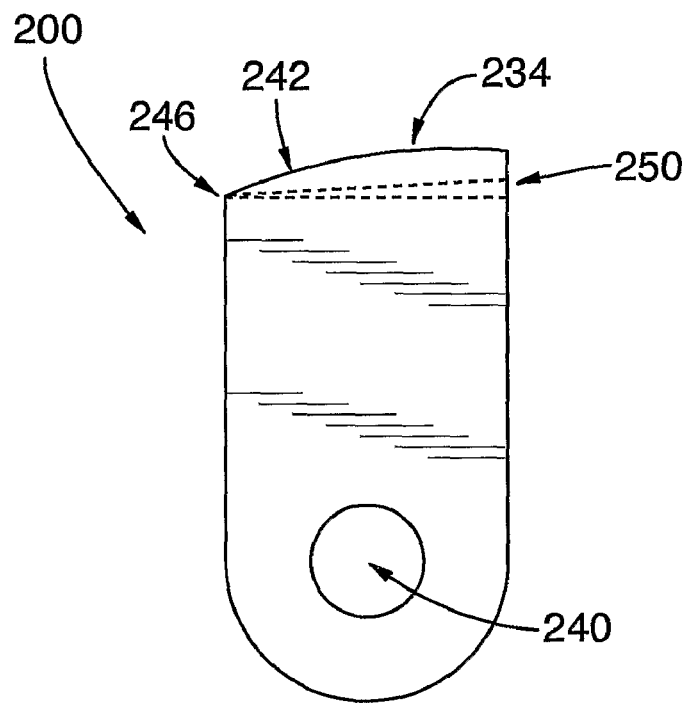
FIG. 16 is a side elevation view of the cutting tooth of FIG. 14.
Figure 17:
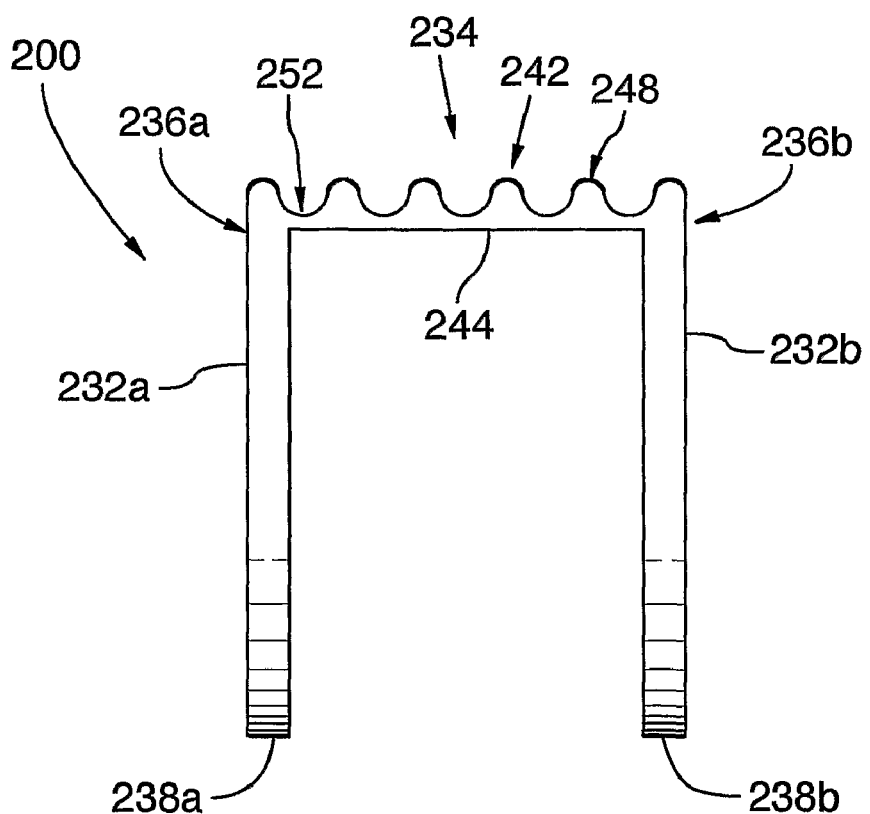
FIG. 17 is a back elevation view of the cutting tooth of FIG. 14.
Figure 18:
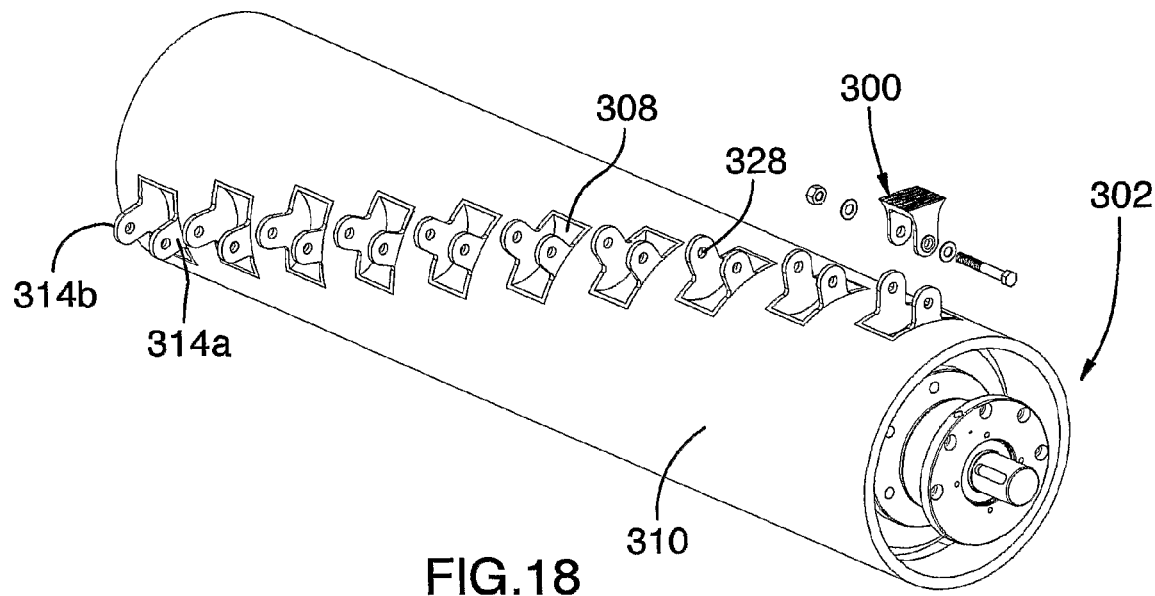
FIG. 18 is a front perspective view of a brush cutter head according to a further embodiment of the present invention.
Figure 19:
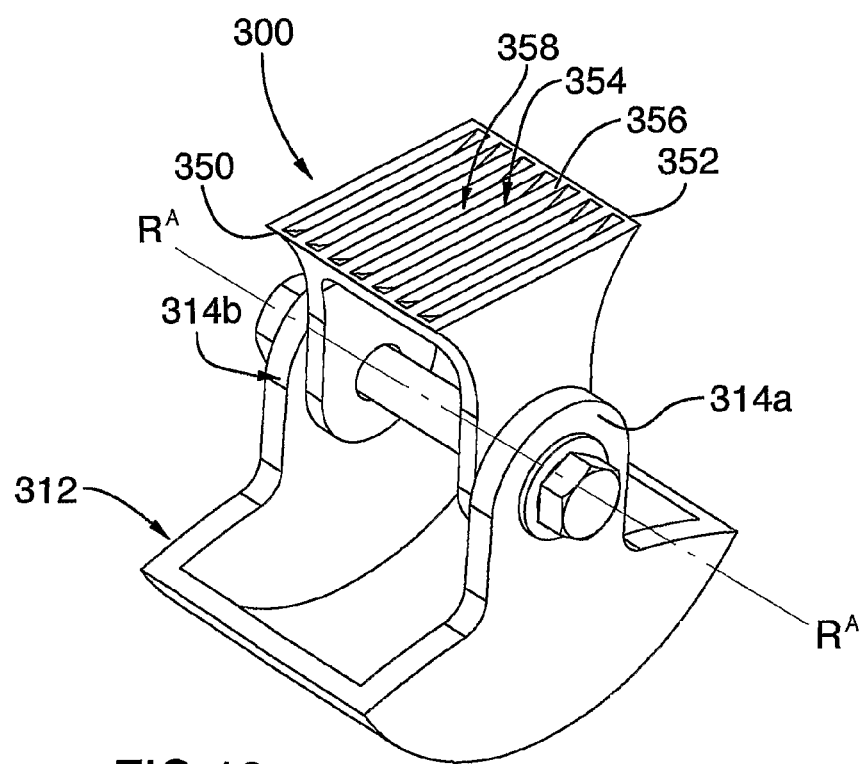
FIG. 19 is a front perspective view showing a mounting bracket and a cutting tooth of the brush cutter head of FIG. 18.
Figure 20:
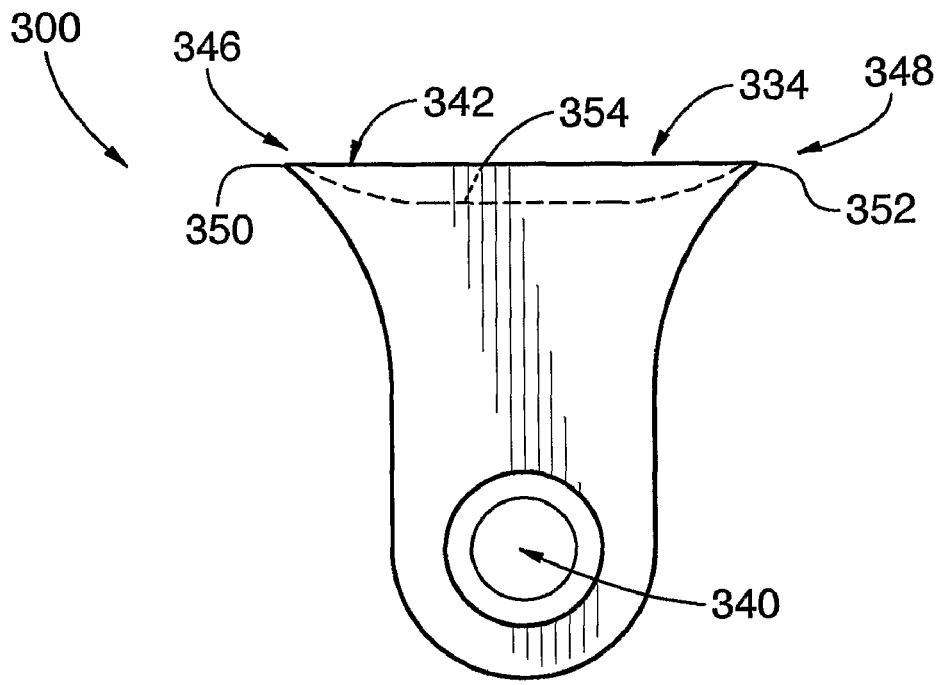
FIG. 20 is a side elevation view of the cutting tooth of FIG. 18.
Figure 21:
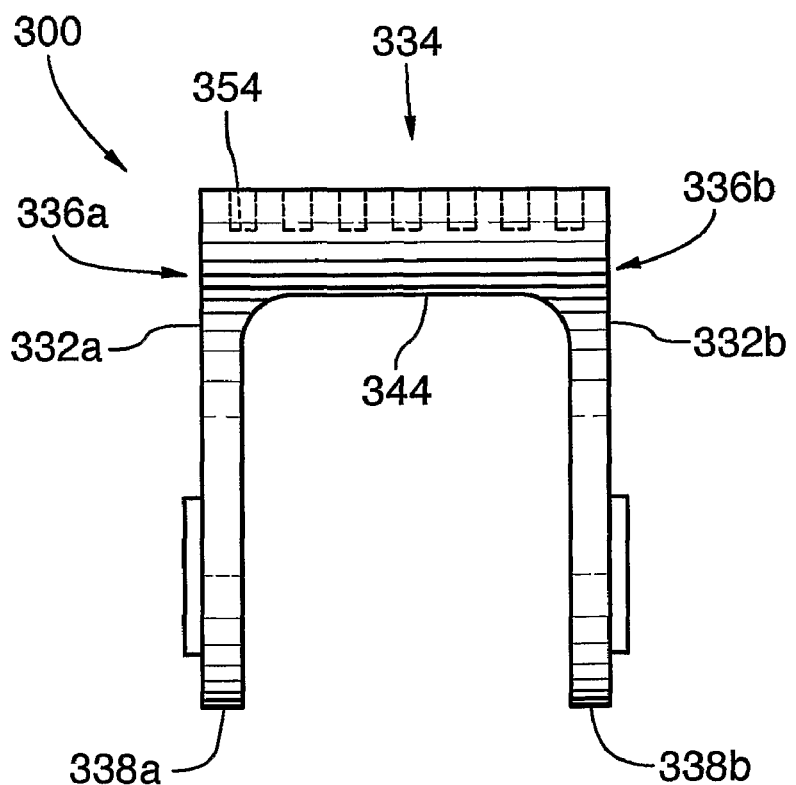
FIG. 21 is a back elevation view of the cutting tooth of FIG. 18.

As shown in FIG. 15, the cutting tooth 200 is sized to fit between the pair of mounting arms 214a and 214b. When assembling the cutting tooth 200 to the mounting bracket 204, the cutting tooth 200 is placed between the mounting arms 214a and 214b such that bores 228 defined therein are aligned with the bores 240 formed in mounting arms 232a and 232b. The pivot pins 230 are then inserted through bores 228 and 240. Thus assembled, the cutting tooth 200 is permitted to rotate about the axis R'-R' defined by the pivot pins 230.

Cutting portion 234 includes a gently curved, first face 242 and an opposed second, face 244. The first and second face 242 and 244 cooperate with each other to define a tapering profile that terminates in a cutting edge 246. In this embodiment, the cutting edge 246 extends generally linearly between ends 236a and 236b of the cutting portion 234.

The first face 242 of cutting portion 234 has a plurality of knuckle-like protuberances in the nature of arcuate ridges 248 formed thereon. The ridges 248 are disposed along the first face 242 in a spaced-apart manner and extend between the cutting edge 246 and the opposed edge 250 of cutting portion 234. Disposed between each pair of adjacent ridges 248 is a groove 252. The alternating arrangement of ridges 248 and grooves 252 defines corrugations 253 that protrude from the first face 242. The corrugations 253 serve to direct rocks, wood chips and other debris away from the cutting edge 246 to hereby reduce the dispersion of the debris over the cutting area.

The cutting tooth 200 is preferably fabricated by bending a metal plate member to form depending mounting arms 232a and 232b, and cutting portion 234. However, it will be appreciated that alternate fabrication methods may be also used to similar advantage.

FIGS. 18 to 21 show an alternative rotating-type cutting tooth generally designated with reference numeral 300. In this embodiment, a plurality of cutting teeth 300 are mounted for rotation about the horizontal cutter head 302 by way of a corresponding plurality of mounting brackets 304.

Mounting bracket 304 is generally similar to mounting bracket 204 of cutter head 202 in that it has a hollow and generally almond-shaped base portion 312 for insertion into a depression 308 on the cutter head surface 310 and pair of spaced apart, mounting arms 314a and 314b that mounted thereon for supporting cutting tooth 300. When the bracket 304 is mounted in the depression 308, only the mounting arms 314a and 314b extend radially from the outer surface 310 of cutter head 302.

In this embodiment, the generally U-shaped cutting tooth 300 has a pair of mounting arms 332a and 332b and a cutting portion 334 centrally positioned between the mounting arms 332a and 332b. The cutting portion 334 includes a pair of opposed ends 336a and 336b from which depend mounting arms 332a and 332b, respectively. Each mounting arm 332a and 332b terminates with a free end 338a and 338b. Defined adjacent each free end 338a, 338b is a bore 340 for receiving a pivot pin 330.

Similarly to cutting tooth 200, the cutting tooth 300 is sized to fit between the pair of mounting arms 314a and 314b of the mounting bracket 304. When assembling the cutting tooth 300 to the mounting bracket 304, the cutting tooth 300 is placed between the mounting arms 314a and 314b such that a pair of bores 328 defined therein are aligned with the bores 340 formed in mounting arms 332a and 332b. The pivot pins 330 are then inserted through bores 328 and 340. Thus assembled, the cutting tooth 300 is permitted to rotate about the axis $R^4$-$R^4$ defined by the pivot pins 330.

The cutting portion 334 of cutting tooth 300 includes a generally planar first face 342 and a second, opposed, arcuate face 344. Each face 342, 344 includes a first lateral edge 346 and a second lateral edge 348. The first face 342 and the second face 344 meet at each of their respective (first, second) lateral edges 346, 348 to define a cutting edge 350, 352. The cutting edges 350 and 352 extend generally linearly between ends 336a and 336b of the cutting portion 334. As will be appreciated by a person skilled in the art, the cutting edge 350 may be a trailing edge or a leading edge depending on whether the drum is being rotated in a clockwise or counter-clockwise direction. In this embodiment, the cutting edge 350 is the leading edge.

The first face 342 of cutting portion 334 has a plurality of grooves 354 formed therein. The grooves 354 are disposed along the first face 342 in a spaced-apart manner and extend between the cutting edges 350 and 352. A ridge 356 is defined within the first face 342 between each adjacent pair of grooves 354. Thus configured, the alternating arrangement of grooves 354 and ridges 356 defines corrugations 358. However, unlike corrugations 253 shown in FIG. 15, the corrugations 358 do not protrude from the first face 342. Rather, the corrugations 358 (and ridges 356) are formed flush with the first face 342. As in other previously described embodiments, the corrugations 358 serve to direct rocks, wood chips and other debris away from the cutting edge 350, 352 (as the case may be) to hereby reduce the dispersion of the debris over the cutting area.

The cutting tooth 300 is preferably fabricated by bending a metal plate member to form depending mounting arms 332a and 332b, and cutting portion 334. However, it will be appreciated that alternate fabrication methods may be also used to similar advantage. For instance, cutting tooth could be forged or cast.

Cutting teeth 20, 100, 200, 300 and 400 described thus far are generally adapted for attachment to rotating, drum-type, cutter heads. Other alternative cutting teeth embodying the principles of the invention could also be configured for attachment onto endless, rotating belts.

While specific embodiments of the present invention have been described, it will be appreciated that it is capable of further modifications. Therefore, this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

What is claimed is:

1. A cutting tooth for use on a cutter head comprising a cutting portion, the cutting portion having a leading face and a trailing face, the leading and trailing faces of the cutting portion cooperating with each other to define a tapering profile terminating in a cutting edge, the trailing face having a plurality of ridges and grooves, the plurality of ridges and grooves being arranged in an alternating fashion to define corrugations running along the trailing face.

2. The cutting tooth of claim 1 further comprising a base portion, the base portion having a first end and an opposed second end, the cutting portion being carried on the second end of the base portion.

3. The cutting tooth of claim 2 wherein the cutting portion is integrally formed with the base portion.

4. The cutting tooth of claim 2 wherein the base portion is sized larger than the cutting portion.

5. The cutting tooth of claim 2 wherein the base portion has a leading face which meets the leading face of the cutting portion at a first juncture and a trailing face which meets the trailing face of the cutting portion at a second juncture, the trailing face of the cutting portion being canted relative to the trailing face of the base portion toward the leading direction.

6. The cutting tooth of claim 5 wherein an angle is formed between the trailing face of the cutting portion and the trailing face of the base portion; and the angle is a reflex angle.

7. The cutting tooth of claim 5 wherein the cutting edge is carried forwardly of at least a portion of the leading face of the base portion.

8. The cutting tooth of claim 5 wherein the plurality of ridges and grooves extends between the second juncture and the cutting edge.

9. The cutting tooth of claim 8 wherein each groove of the plurality of grooves has a depth and the depth of at least one of the grooves varies between the second juncture and the cutting edge.

10. The cutting tooth of claim 8 wherein each groove of the plurality of grooves has a length, the lengths of all the grooves being equal.

11. The cutting tooth of claim 8 wherein the plurality of ridges and grooves extends from the second juncture toward the cutting edge stopping shy of the cutting edge.

12. The cutting tooth of claim 2 wherein the base portion has an aperture defined therein for receiving a fastener to permit attachment of the cutting tooth to a mounting block, the aperture extending between the leading and trailing faces of the base portion.

13. The cutting tooth of claim 12 wherein the leading face of the base portion has a rebate formed therein, the rebate providing access to the aperture and being sized larger than the aperture.

14. The cutting tooth of claim 13 wherein the rebate has a generally hexagonal shape.

15. The cutting tooth of claim 12 wherein the base portion has means associated therewith for discouraging rotation of the cutting tooth relative to the mounting block when the cutting tooth is attached to the mounting block.

16. The cutting tooth of claim 15 wherein at least a portion of the means for discouraging rotation are carried on the trailing face of the base portion.

17. The cutting tooth of claim 1 wherein the ridges and grooves of the plurality of ridges and grooves are disposed substantially perpendicular to the cutting edge.

18. The cutting tooth of claim 1 wherein the cutting portion has a pair of spaced apart, first and second lateral faces; and the corrugations run between the first and second lateral faces of the cutting portion.

19. The cutting tooth of claim 18 wherein the corrugations run from the first lateral face to the second lateral face of the cutting portion.

20. The cutting tooth of claim 18 wherein the cutting edge extends generally linearly between the first and second lateral faces of the cutting portion.

21. The cutting tooth of claim 1 wherein the corrugations run substantially parallel to the cutting edge.

22. The cutting tooth of claim 1 wherein when viewed in cross-section, the corrugations have a profile selected from the group consisting of: (a) a generally arcuate profile; (b) a dentate profile; (c) a zigzag profile; and (d) a generally crenellated profile.

23. The cutting tooth of claim 1 wherein the corrugations are machine ground into the trailing face of the cutting portion.

24. The cutting tooth of claim 1 wherein the corrugations on the trailing face are formed by one of casting or forging.

25. The cutting tooth of claim 1 wherein the trailing face defines a plane and the ridges of the plurality of ridges protrude from the plane of the trailing face.

26. The cutting tooth of claim 1 wherein the trailing face defines a plane and the ridges of the plurality of ridges are flush with the plane of the trailing face.

27. The cutting tooth of claim 1 wherein the ridges of the plurality of ridges are evenly spaced from each other.

28. In combination a cutting tooth for use on a cutter head, a mounting block for attaching the cutting tooth onto the cutter head, the cutting tooth having a cutting portion, the cutting portion having a leading face and a trailing face, the leading and trailing faces of the cutting portion cooperating with each other to define a tapering profile terminating in a cutting edge, the trailing face having a plurality of ridges and grooves, the plurality of ridges and grooves being arranged in an alternating fashion to define corrugations running along the trailing face, and the cutting tooth being releasably mountable to the mounting block.

29. The combination of claim 28 wherein the mounting block has a leading face and a trailing face; and when mounted to the mounting block, the cutting tooth is carried on the leading face of the mounting block.

30. The combination of claim 29 the cutting tooth includes a base portion, the base portion having a first end and an opposed second end, the cutting portion being carried on the second end of the base portion.

31. The combination of claim 30 wherein the base portion has a leading face which meets the leading face of the cutting portion at a first juncture and a trailing face which meets the trailing face of the base portion at a second juncture, the trailing face of the cutting portion being canted relative to the trailing face of the base portion toward a leading direction.

32. The combination of claim 31 wherein when the cutting tooth is mounted to the mounting block, the trailing face of the base portion abuts the leading face of the mounting block.

33. The combination of claim 32 wherein:
the base portion of the cutting tooth has a first aperture defined therein, the first aperture extending between the leading and trailing faces of the base portion;
the mounting block has a second aperture defined therein, the second aperture extending between the leading and trailing faces of the mounting block; and
the first and second apertures being alignable so as to accommodate a fastener therethrough to thereby permit attachment of the cutting tooth to the mounting block.

34. The combination of claim 33 further comprising a fastener for releasably attaching the cutting tooth to the mounting block.

35. The combination of claim 34 wherein the leading face of the base portion has a rebate formed therein, the rebate providing access to the first aperture and being sized larger than the first aperture.

36. The combination of claim 35 wherein the fastener includes a nut and a bolt; and the bolt has a head shaped to correspond substantially to the shape of the rebate.

37. The combination of claim 35 wherein the shape of the rebate is generally hexagonal.

38. The combination of claim 28 further comprising means for discouraging rotation of the cutting tooth relative to the mounting block.

39. The combination of claim 38 wherein the fastener includes a nut and a bolt having a hexagonal head, the rebate formed in the leading face of the base portion having a shape corresponding substantially to the hexagonal head of the bolt, the hexagonal head and the rebate cooperating with each other to define the means for discouraging rotation.

40. The combination of claim 38 wherein the mounting block has a cutout formed therein and the base portion of the cutting tooth has a lug formed in the mounting block for mating connection with the cutout, the cutout and the lug cooperating with each other to define the means for discouraging rotation.

41. The combination of claim 38 wherein:
the mounting block includes a pair of opposed first and second side faces; and
the means for discouraging rotation includes a pair of spaced apart first and second shoulder portions standing proud of the trailing face of the base portion; the first and second shoulder portions extending between the first and second ends of the base portion, the spacing between the first and second shoulder portions being sized to accommodate therein the mounting block; when the cutting tooth is mounted to the mounting block, the first side face of the mounting block abutting the first shoulder portion and the second side face of the mounting block abutting the second shoulder portion.

42. The combination of claim 28 wherein the cutting tooth is fixedly mounted to the mounting block.

43. The combination of claim 28 wherein the cutting tooth is rotatably mounted to the mounting block.

44. The combination of claim 28 wherein the plurality of ridges and grooves is disposed substantially perpendicular to the cutting edge.

45. The combination of claim 28 wherein the cutting portion has a pair of spaced apart, first and second lateral faces; and the corrugations run between the first and second lateral faces of the cutting portion.

46. The combination of claim 28 wherein the corrugations run substantially parallel to the cutting edge.

47. The combination of claim 28 wherein when viewed in cross-section, the corrugations have a profile selected from the group consisting of: (a) a generally arcuate profile; (b) a dentate profile; (c) a zigzag profile; and (d) a generally crenellated profile.

48. The combination of claim 28 wherein the trailing face defines a plane and the ridges of the plurality protrude from the plane of the trailing face.

49. The combination of claim 28 wherein the trailing face defines a plane and the ridges of the plurality of ridges are flush with the plane of the trailing face.

50. The cutting tooth of claim 28 wherein the ridges of the plurality of ridges are evenly spaced from each other.

51. A cutter head for use on a cutter comprising:
a drum rotatably mounted on the cutter, the drum having a radial outer surface;
means for causing rotation of the drum relative to the cutter;
at least one mounting block for supporting a cutting tooth, the at least one mounting block being carried on the radial outer surface of the drum; and
at least one cutting tooth mounted to the at least one mounting block, the at least one cutting tooth including a cutting portion, the cutting portion having a first face and a second face, the first face and the second face cooperating to define a tapering profile terminating in a cutting edge, the first face having a plurality of ridges and grooves, the plurality of ridges and grooves being arranged in an alternating fashion to define corrugations running along the first face.

* * * * *